Aug. 21, 1956 E. A. NEWTON 2,759,741
STABILIZING SYSTEM FOR THE REDUCTION
OF SWAYING OF A ROAD VEHICLE
Filed Dec. 10, 1952 3 Sheets-Sheet 1

Inventor
EDWARD ALBERT NEWTON

By Frederick E. Hane
Attorney

Inventor
EDWARD ALBERT NEWTON

By Frederick L. Hans

Attorney

Aug. 21, 1956

E. A. NEWTON 2,759,741

STABILIZING SYSTEM FOR THE REDUCTION
OF SWAYING OF A ROAD VEHICLE

Filed Dec. 10, 1952

3 Sheets-Sheet 3

Inventor
EDWARD ALBERT NEWTON

By *Frederick E. Hane*

Attorney

United States Patent Office 2,759,741
Patented Aug. 21, 1956

2,759,741

STABILIZING SYSTEM FOR THE REDUCTION OF SWAYING OF A ROAD VEHICLE

Edward Albert Newton, Lancaster Gate, London, England

Application December 10, 1952, Serial No. 325,136

Claims priority, application Great Britain December 13, 1951

5 Claims. (Cl. 280—112)

This invention relates to stabilising systems for road vehicles and has for an object the reduction of swaying of a vehicle on effecting of a turn, without reducing the effectiveness of the road springs of the vehicle.

A vehicle stabilising system according to the invention comprises for each wheel a hydraulic ram connected to the road spring for that wheel, the ram and road spring being operatively connected in series between the chassis and axle, and means for selectively directing liquid under pressure to the rams to tilt the vehicle inwardly on the vehicle effecting a turn. By having the ram and road spring in series between the chassis and axle of the wheel, the road spring can perform its function properly when the ram is extended and thereby full springing of the vehicle is achieved even when the ram is extended for a turn of the vehicle.

Preferably the ram is connected between the chassis and the road spring so that the ram can be firmly secured on the chassis.

Figure 1:
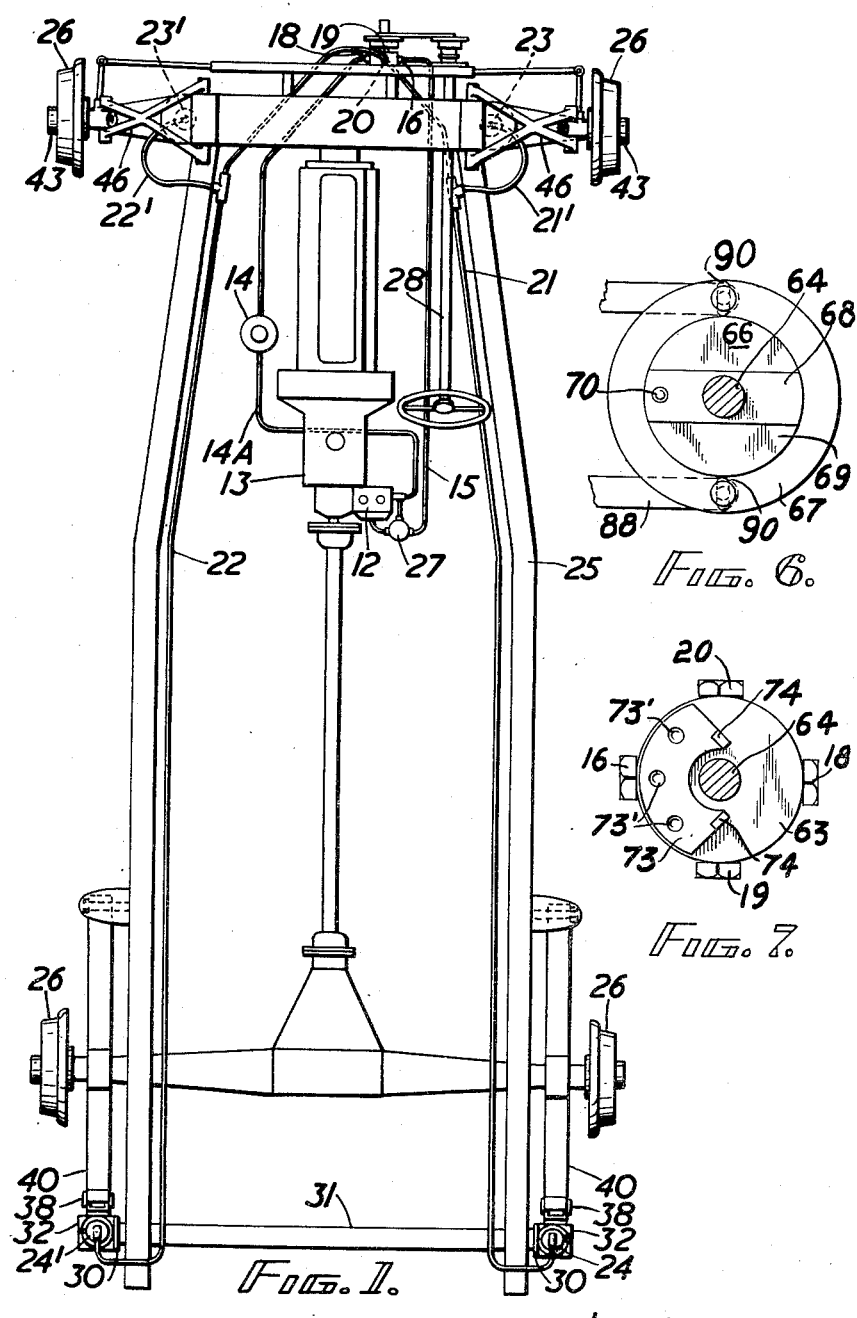
Figure 2:
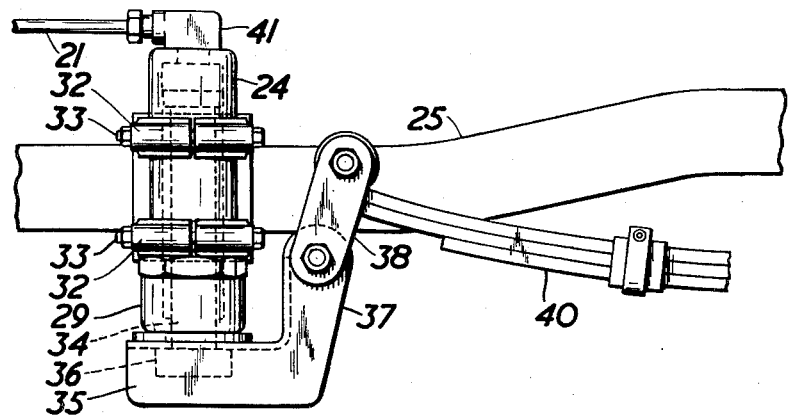
Figure 3:
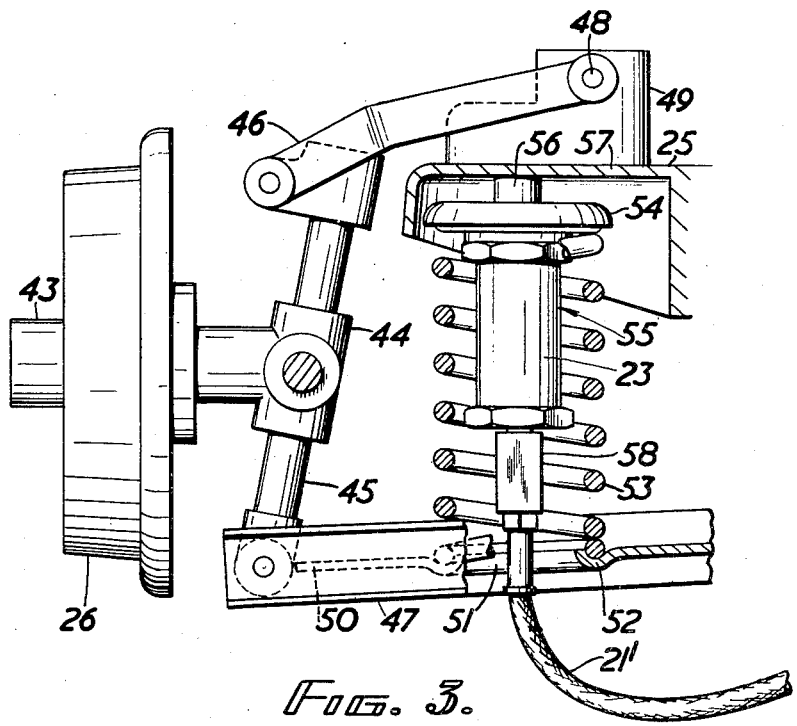
Figure 4:
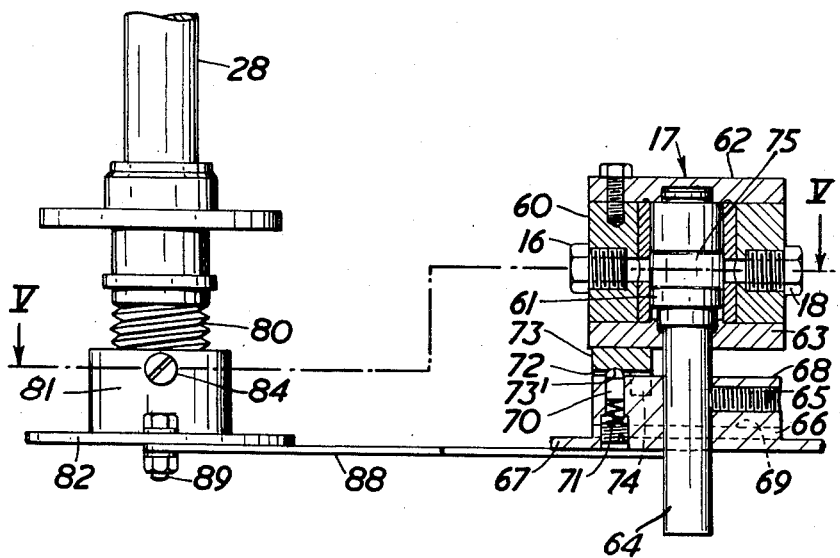
Figure 5:
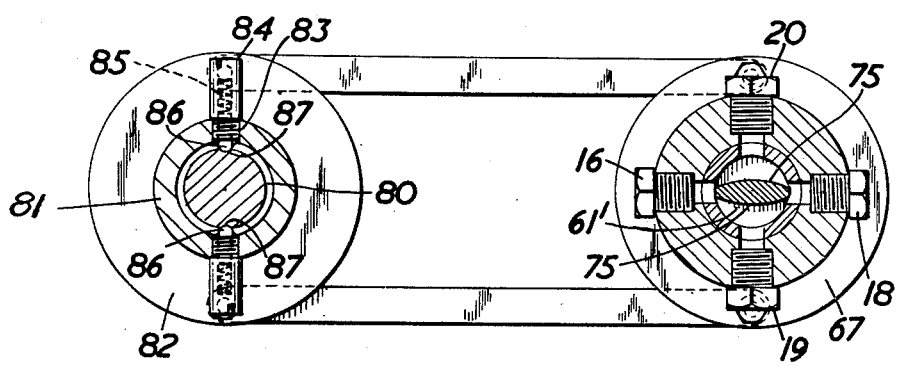

The invention will be more clearly understood by way of example from the following description of a vehicle stablising system, reference being made to the accompanying drawings, in which, Figure 1 is a plan view of the chassis, Figure 2 is a side view of a ram for a rear wheel, Figure 3 is a side view of a ram for a front wheel, Figure 4 is a side view of a valve mechanism for the rams, Figure 5 is a section on the line V—V of Figure 4, Figure 6 is a plan view of a component of the valve mechanism of Fig. 4, and Figure 7 is an underplan view of the valve mechanism.

Referring to Figure 1, a small piston pump 12 is mounted on the gear box 13 of the vehicle and is gear driven from the driven end of the gear box. Pump 12 draws oil from a reservoir 14 through line 14A and delivers it through a line 15 to an inlet port 16 of a rotary valve 17. Valve 17 has outlet ports 18, 19, 20 connected respectively back to the reservoir 14, to a first line 21 and to a second line 22. Line 21 is connected to the cylinders of a ram 24 and through line 21' to that of a ram 23 mounted between the chassis 25 and the road springs of the front and back off side wheels 26 respectively while line 22 is similarly connected to the cylinders of two rams 23', 24' similarly mounted on the near-side. A pressure relief valve 27 is located in line 15 to bypass the oil pumped by pump 12 back to the inlet of the pump when the oil pressure exceeds a given value. This relief valve is adjusted for the vehicle so that the pressure at which it operates exceeds the value for effecting the full extension of the rams.

The valve 17 is controlled by the steering column 28 in a manner to be described hereinafter.

Figure 2 shows in greater detail the ram 24 for a rear wheel. As shown therein, the cylinder 29 of the ram is clamped to a plate 30 welded on the end of a cross bar 31 which is secured to chassis 25, by two split collars 32 which are bolted to plate 30 and which are tightened on the cylinder 24 by bolts 33. The piston 34 is axially arranged in the cylinder 24 and at its lower end is secured to an arm 35 by nut 36. Arm 35 has an upwardly projecting part 37 which is pivoted to shackle 38 of the laminated road spring 40 for the rear wheel 26. Oil line 21 is connected to the union 41 at the top of the cylinder so that oil can be forced under pressure above the piston.

The mounting of the ram 23 for an independently suspended front wheel is shown in Figure 3. The wheel 26 is carried on a stub axle 43 secured by collar 44 on an upstanding member 45 pivotally carried at its ends on upper wishbone links 46 and lower wishbone links 47. Links 46 are mounted on a horizontal torsion bar 48 carried in a cover 49 secured on chassis 25 while link 47 is pivotally secured at its inner end to the chassis 25. Links 47 carry a horizontal plate 50 between them. This form of suspension is well known and forms no part of this invention.

A hole 51 is formed in plate 50 which also has an annular recess 52 round the hole 51 to receive the lower end of a strong helical spring 53. The upper end of spring 53 engages against a flange 54 secured to upper end of cylinder 55 of ram 23. The piston 56 protrudes from the upper end of the cylinder and is bolted securely to the web 57 of chassis 25. The branch line 21' of line 21 passes through hole 51 and is connected to a union 58 communicating with the bottom of the cylinder 55 below the piston.

Turning now to Figures 4 and 5, the rotary valve 17 comprises a tubular body 60 having the ports 16, 18, 19, 20 located therein at 90° separations, the ports communicating with the internal cylindrical space within the body 60 and ports 16, 18 being diametrically opposite one another. A close fitting cylindrical valve member 61 is mounted rotatably within body 60 and is held in place by two end plates 62, 63 for the body 60. A shaft 64 integral with valve member 61 passes through end plate 63 and carries a collar 66 secured thereto by a screw 65 engaging with an indentation in the shaft 64. The screw 65 is located in a recess in a diagonal raised part 68 on the upper surface 69 of the collar 66 and this part also carries an upwardly directed plunger 70 outwardly biased by spring 71. Plunger 70 engages against the lower surfaces 72 of an arcuate block 73 on end plate 63 which block carries at either end stop members 74 against which the part 68 engages at the extremities of its rotary movement. Block 73 further has three recesses 73' adapted to receive plunger 70, one recess being located centrally between stop members 74 and the other two near the stop members 74. The plunger 70 co-operates with recesses 73' to hold the valve member in its central position as shown in Fig. 5, or in either of its extreme positions when the steering column has been turned sufficiently. Collar 66 has an outwardly extending flange 67.

At the level of the ports 16, 18, 19 and 20 the valve member 61 is cut away at either side to form a reduced portion 61' having two convex surfaces 75 and spaces between these surfaces and the internal surface of the body 60. In the normal position shown in Figure 5, the inlet port 16 is in communication with all three outlet ports 18, 19, 20 through these spaces, whereas if the shaft is turned through 45° in either direction from this position, the reduced portion cuts off the outlet port 18 from the inlet port 16 and connects the latter to only the port 19 or port 20 according to the direction in which the shaft 64 is turned.

The steering column 28 is threaded at its lower extremity 80 which carries a collar 81 having a flange 82. Collar 81 carries in suitable radial recesses 83 two sleeves 84 which are bored out centrally to receive helical springs 85. Springs 85 urge small balls 86 against the extremity 80 which is provided with two oppositely located indentations 87 into which balls 86 are receivable. Flanges 67 and 82 are coupled together by two strip members 88 which are secured to the flanges by bolts 89 passing through radial slots 90 in the flanges. By locking the strips 88 at differing points along the slots 90 in the flanges 67, 82 the degree of rotation of valve member 61 brought about by a given turn of collar 81 may be adjusted.

The operation of the system is as follows: When the vehicle is travelling in a substantially straight line, the valve member 61 is in the position relative to the outlet ports 18, 19, 20 shown in Figures 4 and 5 and the oil under pressure supplied by pump 12 to inlet port 16 passes freely out of port 18 back to the reservoir 14 and pump 12, there being insufficient build up of pressure in the cylinders 29, 55 to cause operation of the rams 23, 23', 24, 24'. Now suppose, the steering column 28 is turned to effect a turn of the vehicle to the left, say. The steering column 80 will be turned in an anticlockwise direction as seen in Figure 5 and by virtue of the connection through the spring pressed balls 86 and indentations 87, collar 82 and collar 67 will also turn anticlockwise, with the result that the reduced part 61' of the valve member 61 will cut off ports 18 and 19 from inlet port 16 and port 20 only will be in communication with pump 12. The oil pressure in lines 21, 21' will therefore build up and will act on the pistons 34, 56 of the rams on the off-side of the vehicle and cause these pistons to be forced out to effect lifting of the off-side of the chassis with respect to the wheels. Similarly, if the steering column 28 is turned for a turn to the right, the rams 23', 24' on the near-side will be operated to raise the near-side of the chassis with respect to the wheels. In this way, the vehicle is stabilised on turning.

As soon as the pistons 34, 56 are fully extended, the oil pressure exceeds the before mentioned given value and the relief-valve 27 operates to bypass all further oil from the pump 12 back to the inlet thereof.

The stop members 74 prevent rotation of the valve member 61 from the position shown in Figure 5 beyond 45° in either direction. If the steering column 28 is turned through an amount tending to increase further the rotation of valve member 61, the spring pressed balls 86 leave their indentations 87 and ride over the threads of extremity 80, thereby permitting turning of the column 28 without any accompanying movement of the valve member. When the steering column is returned to the neutral position, balls 86 again engage in indentations, the valve member 61 is thereafter turned back to the normal position shown in the drawings, the oil under pressure in the rams 23, 24 or 23', 24' escapes through outlet port 18 to reservoir 14 and the rams take up their normal unextended positions.

It will have been observed that the pump 12 is driven from the driven end of gear box 13 and therefore delivers oil at a rate proportional to the speed of the vehicle. For short turns, the lifting of the vehicle will thus be governed by the vehicle speed, being small when the speed is low and increasing for increased speeds.

When the steering column 28 is turned through a small angle less than 5° say, the reduced part 61' is turned insufficiently to clear the outlet port 18 and no actuation of the rams occurs. This enables the vehicle to be manoeuvred through small angles without operation of the rams. The minimum angle at which the rams become effective can be varied by adjusting the position of the bolts 89 in the radial slots in flanges 67, 82.

An important feature of the invention is that the rams 23, 24, 23', 24' when extended do not in any way hinder the normal springing of the vehicle. The rams, as will have been observed, are between the chassis 25 and the springs 40, 53 of the wheels. In this way, the road springs still perform unimpaired their function when the rams are extended. If the rams were mounted between the chassis and the wheel axles, in parallel with the road springs, then the majority of the damping of the springs would be lost and the stabilisation of the vehicle would be achieved only with the loss of effective springing and possible damage to the vehicle.

It has been found that a vehicle equipped with the stabilising system described is capable of much faster and more comfortable turns than has before been possible, the danger of overturning when effecting a fast turn being decreased considerably.

I claim:

1. In a road vehicle comprising a chassis, axles for road wheels, a road spring for each said axle for mounting said axle on said chassis, and a steering column; a stabilising system comprising for each axle an hydraulic ram having two relative moveable parts connected respectively to the road spring for the axle and the chassis, a source of liquid pressure, a tubular valve body having four openings spaced angularly at 90° separations, conduits connecting a pair of diametrically opposite openings to the outlet of said source and to a return inlet to said source, conduits connecting the other pair of diametrically opposed openings to the rams on one side of the vehicle and to the rams on the other side respectively, a valve plate rotatably mounted in said valve body, said plate being a sliding fit within said body and having a width at its extremities less than the width of the openings to said source, and a connection between said steering column and said valve plate, said connection including a lost motion device permitting said column to continue turning after motion of said plate has stopped.

2. In a road vehicle comprising a chassis, axles for road wheels, helical road springs for at least one of said axles on each side of the vehicle, for mounting those axles on said chassis, and a steering column; a stabilising system comprising for each said helical spring a hydraulic ram mounted at least partly within said spring and having two parts connected respectively to an extremity of the spring and to the chassis, a source of liquid pressure, a tubular valve body having four openings spaced angularly at 90° separations, conduits connecting a pair of diametrically opposite openings to the outlet of said source and to a return inlet to said source, conduits connecting the other pair of diametrically opposed openings to the rams on one side of the vehicle and to the rams on the other side respectively, a valve plate rotatably mounted in said valve body, said plate being a sliding fit within said body and having a width at its extremities less than the width of the openings to said source, and a connection between said steering column and said valve plate, said connection including a lost motion device permitting said column to continue turning after motion of said plate has stopped.

3. In a road vehicle comprising a chassis, axles for road wheels, a road spring for each said axle for mounting said axle on said chassis, and a steering column; a stabilising system comprising for each axle an hydraulic ram having two relative moveable parts connected respectively to the road spring for the axle and the chassis, a source of liquid pressure, a tubular valve body having four openings spaced angularly at 90° separations, conduits connecting a pair of diametrically opposite openings to the outlet of said source and to a return inlet to said source, conduits connecting the other pair of diametrically opposed openings to the rams on one side of the vehicle and to the rams on the other side respectively, a valve plate rotatably mounted in said valve body, said plate being a sliding fit within said body and having a width at its extremities less than the width of the openings to said source, a collar on said steering column, a connection between said collar and said valve plate, a spring pressed plunger in said collar engageable with an indentation in said column, and stop means for limiting the angular movement of said valve plate in either sense, said plunger causing said collar and column to turn together while the valve plate is permitted to move, and permitting movement of said column independently of said collar when said valve plate is restrained by said stop means from further movement.

4. In a road vehicle having a chassis, axles for road wheels, a road spring for each said axle for mounting axle on said chassis, and a steering column; a stabilising system comprising for each axle a hydraulic ram connected to the road spring for that axle, said ram and road spring being operatively connected in series between said chassis and said axle, a source of pressure liquid, a two-way valve for connecting said source alternatively to said rams on one side of said vehicle and to said rams on the other side of said vehicle, a control connection between said steering column and said valve, whereby said valve selectively directs pressure liquid to said rams to tilt said vehicle inwards on said steering column being operated for a turn, and lost motion means in said connection permitting movement of said mechanism to continue after operation of said valve.

5. In a road vehicle having a chassis, axles for road wheels, a road spring for each said axle for mounting said axle on said chassis, and a steering column; a stabilising system comprising for each axle a hydraulic ram connected to the road spring, said ram and road spring being operatively connected in series between said chassis and said axle, a source of pressure liquid, a tubular valve body having four openings spaced angularly at 90° separations, conduits connecting a pair of diametrically opposite openings to the outlet of said source and to a return inlet to said source, conduits connecting the other pair of diametrically opposed openings to the rams on one side of the vehicle and to the rams on the other side respectively, a valve plate rotatably mounted in said valve body, said plate being slidably fitted within said body and having a width at its extremities less than the width of the openings to said source, and a connection between said steering column and said valve plate, said connection including lost motion means permitting said column to continue turning upon stoppage of the motion of said plate.

References Cited in the file of this patent

UNITED STATES PATENTS

| | | |
|---|---|---|
| 2,110,809 | Murphy | Mar. 8, 1938 |
| 2,490,719 | Tank | Dec. 6, 1949 |

FOREIGN PATENTS

| | | |
|---|---|---|
| 487,786 | Great Britain | June 23, 1938 |
| 518,848 | Great Britain | Mar. 8, 1940 |